United States Patent Office 3,686,038
Patented Aug. 22, 1972

3,686,038
HIGH ENERGY DENSITY BATTERY WITH TRIHYDROCARBYL CARBAMATE BASED ELECTROLYTE
Bruce H. Garth, Newark, Del., assignor to E. I. du Pont de Nemours and Company, Wilmington, Del.
No Drawing. Filed Feb. 3, 1971, Ser. No. 112,414
Int. Cl. H01m 11/00
U.S. Cl. 136—100 R     9 Claims

ABSTRACT OF THE DISCLOSURE

High energy density galvanic batteries having high utilization of active electrode material can be prepared using voltaic cells having an anode of one of the light metals of Group I–A or II–A of the Periodic Table, a cathode of iron sulfide, copper sulfide, nickel sulfide or nickel fluoride and an electrolyte comprised of trihydrocarbyl carbamate as solvent and up to about 30% by weight of a conductive salt, having the formula $MM'F_6$ where M is Li, Na or K and M' is P, As or Sb, dissolved therein. Optionally up to about 40% by weight of the solvent can be comprised of a secondary solvent, having the formula $R^3O(CH(R^4)CH_2O)_nR^3$ in which $R^3$ is a $C_1$ to $C_3$ alkyl group, $R^4$ is hydrogen or a methyl group and $n$ is 0–2, to improve low temperature performance of the battery.

BACKGROUND OF THE INVENTION

(1) Field of the invention

This invention relates to high energy density batteries having active metal anodes, metallic sulfide or fluoride cathodes and non-aqueous electrolytes.

(2) Prior art

The art discloses a number of high energy density galvanic batteries having voltaic cells consisting of light metal anodes, depolarizing cathodes and liquid non-aqueous electrolytes. Li/CuS and Li/FeS galvanic couples for use with non-aqueous electrolytes are disclosed by Dechenaux et al. in "Entropie," vol. 10, pp. 18–19 (1966). Herbert in U.S. Pat. No. 3,248,265 teaches the use of a lithium anode with nickel sulfide. Technical Documentary Report No. ASD–TDR–62–1, April 1962 discloses an Li/NiF$_2$ couple and also suggests LiPF$_6$ based electrolyte for such couples. Mayer et al. in U.S. Pat. No. 3,185,590 discloses the use of a non-aqueous electrolyte based on dimethyl formamide. None of these references suggest or disclose the use of a carbamate as an electrolyte solvent.

While the theoretical energy, i.e., the electrical energy potentially available from a selected anode-cathode couple, is easily calculated, there is a need to choose a non-aqueous electrolyte for such couple that permits the actual energy produced by the complete battery to approach the theoretical energy to a practical degree. The problem is that it is practically impossible to predict in advance how well a non-aqueous electrolyte will function, in this respect, with a selected couple. More broadly stated, such batteries must be considered as whole units, each unit having three parts which parts are not predictably interchangeable from unit to unit.

SUMMARY OF THE INVENTION

This invention provides a novel high energy density galvanic battery comprised of at least one voltaic cell comprising an anode of a Group I–A or II–A metal having an equivalent weight no greater than 23, a cathode consisting essentially of at least one of the sulfides of iron, copper or nickel or a cathode consisting essentially of NiF$_2$ and an electrolyte having a conductivity of at least $1\times10^{-3}$ ohm$^{-1}$·cm.$^{-1}$, comprising a solvent consisting essentially of from 100 to 60% by weight of a primary solvent having the formula

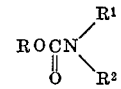

in which R is a $C_1$ to $C_4$ alkyl group, $R^1$ is a $C_1$, $C_4$ alkyl group, $R^2$ is a $C_1$ to $C_4$ alkyl group or a $C_6$ to a $C_8$ carbocyclic aryl group or $R^1+R^2$ together are a $C_4$ to $C_5$ alkylene diradical or the 3-oxapentylene-1,5 diradical, and complementally from 0 to about 40% by weight of a secondary solvent having the formula $R^3O(CH(R^4)CH_2O)_nR^3$ in which $R^3$ is a $C_1$ to $C_3$ alkyl group, $R^4$ is H or a methyl group and $n$ is 0, 1 or 2 and at least one dissolved salt having the formula $MM'F_6$ where M is selected from the group consisting of Li, Na and K and M' is selected from the group consisting of P, As and Sb.

Such batteries show very high electrochemical utilization of active anode and cathode materials, practical shelf-life when not in use, little or no gas formation during and after use, and, with the secondary solvent present, good low temperature performance.

DESCRIPTION OF THE INVENTION

The discussion of the battery and cell components will be more easily understood wtih reference to the anode, electrolyte and cathode components.

Anode

The high energy density concept requires maximum battery energy output from a minimum weight and/or volume of battery components. Thus, the highly electropositive light metals of Groups I–A and II–A of the Periodic Table are the most promising anode materials. Such metals having an equivalent weight no greater than 23 are used to avoid heavier metals with less available energy for a selected weight of the metal. By equivalent weight is meant the metal atomic weight divided by its usual maximum oxidation valence. Of these metals lithium is preferred because it has the lowest specific gravity and is the most electropositive of all the metals. Lithium is also preferred because as a ductile, soft metal it is easily disposed in a battery in intimate electrical contact with a current collecting means providing an anode contact external to the battery. Of course sodium shares this important advantage, but sodium is less preferred because, although it has almost twice the specific gravity of lithium, it has about 3 times the equivalent weight.

Electrolyte

Broadly the electrolytes comprise a trihydrocarbyl carbamate solvent component and, to provide conductivity, a salt component dissolved in said solvent component. The solvent component can be a single-base solvent consisting of at least one carbamate having the formula

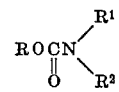

in which R is a $C_1$ to $C_4$ alkyl group, $R^1$ is a $C_1$ to $C_4$ alkyl group, $R^2$ is a $C_1$ to $C_4$ alkyl group or a $C_6$ to $C_8$ carbocyclic aryl group or $R^1+R^2$ together are a $C_4$ to $C_5$ alkylalkylene diradical or the 3-oxapentylene-1,5 diradical. Representative of such carbamates are trimethyl carbamate, ethyl-N,N'-dimethyl carbamate, tripropyl carbamate, methyl-N,N-dibutyl carbamate, propyl-N,N-dimethyl carbamate, ethyl-N,N-(1,5-pentylene) carbamate, ethyl-N,N-(1,4-butylene) carbamate, methyl-N,N-(3- oxapentylene-1,5)- carbamate, ethyl-N-phenyl-N-methyl carbamate, methyl-N-tolyl-N-methyl carbamate, methyl-N-xylyl-N-methyl carbamate and the like. Preferred because of a good balance of physical properties, high solvent power for the salts of the invention, ready availability or easy manufacture are trimethyl carbamate, ethyl-N,N-dimethyl carbamate or mixtures thereof.

Alternatively the solvent component can consist essentially of at least about 60% by weight of at least one of the above trihydrocarbyl carbamates as a primary solvent and complementally up to about 40% by weight of at least one of secondary solvents having the formula $R^3O[CH(R^4)CH_2O]_nR^3$ where $R^3$ is a $C_1$ to $C_3$ alkyl group $R^4$ is hydrogen or methyl and $n$ is 0 to 2. Representative of such secondary solvents are diethyl ether, methylpropyl ether, dipropyl ether, 1,2-dimethoxyethane, the dimethyl ether of diethylene glycol, the diethyl ether of diethylene glycol, 1,2-dipropoxyethane, 1,2-dimethoxypropane and the like. Preferred because of their compatibility with the salts of the invention, miscibility with the above carbamate primary solvents and inertness towards the active metal anodes are the secondary solvents diethyl ether, 1,2-dimethoxyethane or mixtures thereof. The preferred weight ratios of primary-to-secondary solvents are between about 95:5 and about 67.33.

The secondary solvent is useful for providing good low temperature properties to the batteries of the present invention. For example, batteries containing a single-solvent electrolyte often show poor utilization of active electrode materials at 0° C. or below. The presence of the secondary solvent in the electrolyte usually significantly improves such low-temperature electrode utilization.

The salt components of the electrolytes have the formula $MM'F_6$ where M is a cation of Li, Na or K and M' is P, As or Sb. Representative of such salts are $LiPF_6$, $LiAsF_6$, $LiSbF_6$, $NaPF_6$, $NaAsF_6$, $NaSbF_6$, $KPF_6$, $KAsF_6$, and $KSbF_6$. Of the above salts, $LiPF_6$, $KPF_6$, and $KasF_6$ are preferred.

The concentration of such salts in the above single or binary solvents can range up to saturation. Usually at least enough of such salt is dissolved in the solvent to provide an electrolyte having a minimum conductivity at 25° C. of $1 \times 10^{-3}$ ohm$^{-1}$-cm.$^{-1}$. A preferred salt concentration range lies between about 5 and about 30% by weight of the whole electrolyte. This concentration range is especially applicable for the preferred electrolytes summarized in Table I below. Electrolytes in Table I are preferred because they tend to maximize energy output from the invention batteries.

TABLE I

Single-solvent electrolytes:
  Trimethyl carbamate and $NaAsF_6$
  Trimethyl carbamate and $KPF_6$
  Trimethyl carbamate and $KAsF$
Binary solvent electrolytes:
  Trimethyl carbamate, 1,2-dimethoxyethane and $LiPF_6$
  Trimethyl carbamate, diethyl ether and $LiPF_6$
  Ethyl-N,N-dimethyl carbamate, diethyl ether and $LiPF_6$
  Ethyl-N,N-dimethyl carbamate, 1,2-dimethoxyethane and $LiPF_6$ Particularly preferred electrolytes providing very high energy density batteries consist essentially of from about 85 to about 75% by weight of the single or the binary solvents in Table I, and complementally of from about 15 to about 25% by weight of the salts as listed in Table I.

The electrolytes of this invention are particularly useful because high-energy density batteries containing them tend to build up little or no gas pressure during or after discharge.

Cathodes

Broadly the cathodes of the invention comprise nickel difluoride or any of the sulfides of iron, copper and nickel or mixtures of any two or more of these cathode materials. Representative of such compounds are $FeS_2$, $Fes$, $Cu_2S$, $CuS$, $NiS$, $Ni_7S_6$ and $NiF_2$. It will be appreciated that these cathode materials having the highest electrochemical capacity are preferred. Thus the sulfides Cus, FeS, Nis and $N_7S_6$ are preferred. Nickel difluoride, $NiF_2$, is also preferred for the same reason. Particularly preferred because of its high electrochemical utilization in batteries is CuS and cathodes consisting essentially of CuS.

Finished cathode structures, i.e. cathodes ready for use in batteries can be prepared by a variety of art known means. For example, finished, rigid iron sulfide cathode structures consisting essentially of FeS, i.e. having greater than 70% FeS and some iron oxide are prepared by pressing a mixture of iron and sulfur powders (1:1 atom ratio) into a coherent structure and sintering the structure at 600–650° C. for 10 to 30 minutes. Finished copper sulfide cathodes consisting essentially of CuS, i.e. containing more than 90% CuS, are similarly prepared from a mixture of copper and sulfur powders pressed into a desired shape and cured at above the melting point of sulfur; cf. Example 1. NiS and $Ni_7S_6$ suitable for pressing into finished cathode structures of desired shapes are prepared by sintering in an inert atmosphere a 1:1 atom ratio mixture of nickel and sulfur powders at about 600° C., grinding the resulting products and then pressing the pulverized material into a cathode structure of desired shape. X-ray diffraction analyses indicate that $Ni_7S_6$ is the major product with short periods of such sintering, e.g. up to about 2.5 hours, while NiS is the major product of longer sintering, e.g. about 16 hours. Thus choice of sintering method provides materials consisting essentially of $Ni_7S_6$ or NiS.

Since the preferred sulfides are conductive they may be prepared in direct contact with a current collector means e.g. a metal mesh without the addition of conductive materials to provide the cathode conductivity necessary for battery use. However, performance of such cathode is sometimes improved by the incorporation of minor amounts of a conductor such as carbon black. Usually 5% or less by weight of such conductor is utilized. However, since the $NiF_2$ cathode material has relatively low conductivity, the presence of a conductive additive is required before pressing it into finished cathode structures in contact with a current collector means. Usually $NiF_2$ is pulverized, mixed with 5 to 10% by weight of the mixture of carbon black and with 5 to 10% by weight of a resin binder, e.g. polytetrafluoroethylene powder, and then pressed into a finished cathode structure having from 10 to 20% by weight of combined conductive carbon and binder.

Batteries

This invention does not concern battery design or construction. Operability requires only that the light metal anode and the cathode be separated by and in operable contact with the electrolyte and that the electrodes be in contact with current collector means providing external contacts which can be connected to an external circuit wherein energy from the battery can be utilized. Of course, to protect the active metal anodes from reactive contaminants, it is usually necessary to seal such batteries. Example 1, following, illustrates such sealed battery.

EXAMPLES

Example 1

A 1:1 atom ratio mixture of sublimed sulfur powder and electrolytic copper dust having a 50μ maximum particle size was aged at room temperature for 4 months. By means of a powder press, a 1.9 g. portion of the aged mixture was pressed into a coextensive piece of nickel metal screen using sufficient pressure to produce a flat, coherent disk. The disk was next cured for 1 minute by heating between two nickel plates previously heated to about 350° C. The resulting cathode structure had a single face area of 6.5 cm.$^2$ and contained 1.755 g. of copper sulfide. The cathode was tightly fitted, mesh-sideto-nickel, into a cylindrical machined recess in a nickel plate. In a dry argon atmosphere, the recess in a comparable plate was packed with 0.4 g. of lithium metal. A gas-tight cell was prepared in the argon atmosphere by bolting the two plates together with insulated bolts against an 0.5 mm. thick, circular pad of inert, non-woven fiber held inside a polypropylene spacer ring of somewhat larger diameter than the cathode and anode recesses. A tight seal between the edges of the spacer and the nickel plates was assured by using synthetic chlorinated rubber gaskets. There resulted a cell with anode and cathode faces spaced 0.4 mm. apart. The cell was evacuated and allowed to fill, until the pressure was at atmospheric pressure, with an electrolyte solution consisting essentially of 25 weight percent sodium hexafluoroarsenate dissolved in trimethyl carbamate. After sealing the openings in the plates used to evacuate and to fill the cell, the cell was discharged through a load of 125 ohms at an average voltage of 1.34 volts to an arbitrary cut-off voltage of 1.0 volt. Cathode utilization was 98% calculated as CuS and the battery produced energy to the extent of 575 watt-hours per kg. of lithium and copper sulfide, calculated from the total amount of lithium and copper sulfide originally present in the battery.

The results demonstrate that a very high performance battery is provided by the present invention.

Valved lines entering the openings in the battery plates permitted measuring the gas produced during and after the discharge of the battery. This battery produced no measurable quantity of gas.

Examples 2–5

The discharge performance of batteries prepared and assembled as in Example 1, but charged with an electrolyte consisting essentially of trimethyl carbamate having dissolved therein other salts of the invention is summarized in Table II following. Salt concentrations are given as percent by weight of the whole electrolyte.

| Example number | Salt formula | Salt conc., percent | Cathode util., percent of CuS | Energy density, w.-hr./kg. of Li and CuS | Gas produced, ml./cm.² of cathode area[1] |
|---|---|---|---|---|---|
| 2 | KPF$_6$ | 25 | 80 | 440 | 0.00 |
| 3 | KAsF$_6$ | 25 | 84 | 466 | 0.07 |
| 4 | NaPF$_6$ | 25 | 26 | 152 | 0.00 |
| 5 | LiPF$_6$ | 18 | 59 | 322 | 0.02 |

[1] Cathode area taken as 6.5 cm.².

The following example illustrates an advantage of utilizing a secondary solvent with the primary trihydrocarbylcarbamate.

Example 6

A battery prepared and discharged as in Example 1 containing as the electrolyte 75 weight percent of trimethyl carbamate, 5% weight of diethyl ether and 20 weight percent of LiPF$_6$ showed 85% CuS utilization and delivered 552 w.-hr. of energy per kg. of Li and CuS. The battery produced less than 0.01 ml. of gas per cm.² of cathode area.

Thus, the battery of Example 6 was superior to an essentially identical battery (Example 5) having no secondary solvent in the electrolyte.

The following example demonstrates the substantial non-use storage stability of the invention batteries.

Example 7

After a month's storage at room temperature, a battery prepared as in Example 6 showed 69% CuS utilization and 400 w.-hr. per kg. of Li and CuS on discharge as in Example 6. The battery produced no gas during and after discharge.

The following 4 examples demonstrate the usefulness of other binary solvent electrolytes of the invention.

Example 8

A battery prepared and discharged as in Example 1, but containing as the electrolyte 70 weight percent ethyl-N,N-dimethyl carbamate, 10 weight percent diethyl ether and 20 weight percent LiPF$_6$, showed 83% CuS utilization and 499 w.-hr. kg. of Li and CuS. No gas was produced in this battery during or after discharge.

Example 9

A battery prepared and discharged as in Example 1 but containing as the electrolyte 60 weight percent of ethyl-N,N-dimethyl carbamate, 20 weight percent 1,2-dimethoxyethane and 20 weight percent LiPF$_6$ showed 87% CuS utilization and delivered 535 w.-hr. per kg. of Li and CuS. The battery produced no gas.

The following two examples compare anode material not of this invention.

Example 10

A battery prepared and discharged as in Example 1 but having a calcium metal anode and, as the electrolyte, 70 weight percent ethyl-N-phenyl-N-methyl carbamate, 10 weight percent diethyl ether and 20 weight percent LiPF$_6$, weight about 12% CuS utilization. Gas produced was 0.03 ml./cm.² of cathode face area.

Example 11

A second calcium anode battery was prepared as in Example 10 except that the electrolyte consisted essentially of 70 weight percent timethyl carbamate, 10 weight percent diethyl ether and 20 weight percent LiPF$_6$ showed about 1% CuS utilization. The battery had an open circuit voltage of 1.8 volts and, upon discharge produced 0.06 ml. of gas per cm.² of cathode area.

Examples 12–15

Examples 12–14, Table III, illustrate utilizing cathodes other than CuS in the batteries of this invention. Each battery had as the electrolyte 70 weight percent trimethyl carbamate, 10 weight percent diethyl ether and 20 weight perment LiPF$_6$. In all cases the anode was lithium and the batteries were assembled and discharged as in Example 1.

Example 15 shows a Li/CuS battery operated with this electrolyte, and is included for comparison with the batteries utilizing cathodes other than CuS.

TABLE III

| Example Number | Approximate cathode composition | Cathode utilization, percent [1] | Energy density, watt-hrs./ kg. of Li— cathode [1] | Gas produced, ml./cm.² of of cathodes |
|---|---|---|---|---|
| 12 | Major: Ni$_7$S$_6$ / Minor: NiS | 39 | 198 | 0.00 |
| 13 | Major: FeS / Minor: Iron oxide | 54 | 317 | 0.00 |
| 14 | Major: NiF$_2$ | 50 | 284 | 0.54 |
| 15 [2, 3] | CuS | 70 | 423 | 0.00 |

[1] Calculated as the major component.
[2] Battery stored 1 month before discharge.
[3] Cathode prepared as in Example 1.

What is claimed is:

1. In a high energy density galvanic battery comprising at least one voltaic cell comprising an anode of a Group I–A or II–A metal having an equivalent weight no greater than 23, an electrolyte solution and a cathode selected from the group of cathodes consisting essentially of iron sulfide, copper sulfide, nickel sulfide, nickel difluoride and mixtures of iron sulfide, copper sulfide, nickel sulfide and nickel difluoride, the improvement comprising using as the electrolyte solution as electrolyte having a conductivity at 25° C. of at least $1 \times 10^{-3}$ ohm.$^{-1}$-cm.$^{-1}$ consisting essentially of from 100 to about 60% by weight of at least one primary solvent having the formula

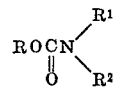

in which R is a $C_1$ to $C_4$ alkyl group, $R^1$ is a $C_1$ to $C_4$ alkyl group, $R^2$ is a $C_1$ to $C_4$ alkyl group or a $C_6$ to $C_8$ carbocyclic aryl group or $R^1+R^2$ together are a $C_4$ to $C_5$ alkylene diradical or the 3-oxapentylene-1,5 diradical, and complementarily from 0 to about 40% by weight of at least one secondary solvent having the formula $$R^3O[CH(R^4)CH_2O]_nR^3$$

in which $R^3$ is a $C_1$ to $C_4$ alkyl group, $R^4$ H or a methyl group and $n$ is 0, 1 or 2 and at least one dissolved salt having the formula $MM'F_6$ where M is selected from the group consisting of Li, Na and K and M' is selected from the group consisting of P, As and Sb.

2. The improved battery of claim 1 in which the anode is lithium, the cathode consists essentially of compounds selected from the group consisting of CuS, FeS, NiS, $Ni_7S_6$ and $NiF_2$ and the electrolyte consists essentially of a primary solvent selected from the group of trimethyl carbamate, ethyl1-N,N-dimethyl carbamate and a mixture of trimethyl carbamate and ethyl-N,N-dimethyl carbamate, a secondary solvent selected from the group of dimethyl ether, 1,2-dimethoxyethane and a mixture of dimethyl ether and 1,2-dimethoxyethane and a salt selected from the group $NaAsF_6$, $KAsF_6$, $KPF_6$ and $LiPF_6$.

3. The improved battery of claim 1 in which the anode is lithium and the electrolyte consists essentially of from about 95 to about 70% by weight of trimethyl carbamate and complementarily from about 5 to about 30% by weight of a salt selected from the group $NaAsF_6$, $KPF_6$ and $KAsF_6$.

4. The improved battery of claim 3 in which the electrolyte consists essentially of from about 85 to about 75% by weight of trimethyl carbamate and complementarily from about 15 to about 25% by weight of a salt selected from the group $NaAsF_6$, $KPF_6$ and $KAsF_6$.

5. The improved battery of claim 4 in which the salt consists essentially of $NaAsF_6$.

6. The improved battery of claim 2 in which the electrolyte consists essentially of from about 95 to about 70% by weight of a binary solvent comprising from about 95 to about 67% by weight of a primary solvent selected from the group trimethyl carbamate, ethyl-N,N-dimethyl carbamate and a mixture of trimethyl carbamate and ethyl-N,N-dimethyl carbamate and complementarily from about 5 to about 33% by weight of a secondary solvent selected from the group of diethyl ether and 1,2-dimethoxyethane and a mixture of diethyl ether and 1,2-dimethoxyethane and complementarily from about 5 to about 30% by weight of $LiPF_6$.

7. The improved battery of claim 6 in which the electrolyte consists essentially of 75% by weight of trimethyl carbamate, 5% by weight of diethyl ether and 20% by weight of $LiPF_6$ and the cathode consists essentially of CuS.

8. The improved battery of claim 7 in which the electrolyte consists essentially of 70% by weight of ethyl-N,N-dimethyl carbamate, 10% by weight of diethyl ether and 20% by weight of $LiPF_6$.

9. The improved battery of claim 7 in which the electrolyte consists essentially of 60% by weight of ethyl-N,N-dimethyl carbamate, 20% by weight of 1,2-dimethoxyethane and 20% by weight of $LiPF_6$.

References Cited

UNITED STATES PATENTS

| | | | |
|---|---|---|---|
| 3,423,242 | 1/1969 | Meyers et al. | 136—154 |
| 3,468,716 | 9/1969 | Eisenberg | 136—154 |
| 3,511,716 | 5/1970 | Gabano et al. | 136—100 R |
| 3,542,601 | 11/1970 | Gabano | 136—100 R |
| 3,544,385 | 12/1970 | Newman | 136—155 |

DONALD L. WALTON, Primary Examiner

U.S. Cl. X.R.

136—154, 155

PO-1050 (5/69)

UNITED STATES PATENT OFFICE
CERTIFICATE OF CORRECTION

Patent No. 3,686,038  Dated August 22, 1972

Inventor(s) Bruce H. Garth

It is certified that error appears in the above-identified patent and that said Letters Patent are hereby corrected as shown below:

Column 2, line 28, "wtih" should be -- with --; line 68, "ethyl-N,N'-dimethyl" should be -- ethyl-N,N-dimethyl --. Column 3, line 53, "KAsF" should be -- $KAsF_6$ --. Column 4, line 1, "Fes" should be -- FeS --. Column 5, line 44, "KPFl" should be -- $KPF_6$ --. Column 6, line 27, "timethyl" should be -- trimethyl --; line 67, "as" (second occurrence) should be -- an --. Column 7, line 9, "$R^4$ H" should read -- $R^4$ is H --; line 19, "ethyll" should be -- ethyl --.

Signed and sealed this 23rd day of January 1973.

(SEAL)
Attest:

EDWARD M. FLETCHER, JR.  ROBERT GOTTSCHALK
Attesting Officer  Commissioner of Patents